(12) United States Patent
Nishiko

(10) Patent No.: US 7,309,073 B2
(45) Date of Patent: Dec. 18, 2007

(54) STEERING SYSTEM

(75) Inventor: Noboru Nishiko, Maebashi (JP)

(73) Assignee: NSK, Ltd., Tokyo (JP)

( * ) Notice: Subject to any disclaimer, the term of this patent is extended or adjusted under 35 U.S.C. 154(b) by 232 days.

(21) Appl. No.: 10/525,209

(22) PCT Filed: May 30, 2003

(86) PCT No.: PCT/JP03/06820

§ 371 (c)(1),
(2), (4) Date: Feb. 22, 2005

(87) PCT Pub. No.: WO2004/018278

PCT Pub. Date: Mar. 4, 2004

(65) Prior Publication Data

US 2006/0108759 A1    May 25, 2006

(30) Foreign Application Priority Data

Aug. 22, 2002   (JP) .............................. 2002-241280

(51) Int. Cl.
*B62D 3/12* (2006.01)
(52) U.S. Cl. .................. 280/93.514; 74/422; 74/424.6
(58) Field of Classification Search ........... 280/93.513, 280/93.514, 93.515; 74/422, 424.6; 180/427, 180/428
See application file for complete search history.

(56) References Cited

U.S. PATENT DOCUMENTS

| | | | | |
|---|---|---|---|---|
| 3,944,015 A | * | 3/1976 | Bishop | .................. 180/428 |
| 5,058,448 A | * | 10/1991 | Kiyooka et al. | ............... 74/422 |
| 5,983,742 A | * | 11/1999 | Morris et al. | ................. 74/422 |
| 6,142,031 A | * | 11/2000 | Phillips | ....................... 74/422 |
| 6,467,366 B1 | * | 10/2002 | Gierc | .......................... 74/422 |
| 6,591,706 B2 | * | 7/2003 | Harer et al. | .................. 74/422 |
| 6,681,885 B2 | * | 1/2004 | Harer | ......................... 180/427 |
| 6,706,127 B1 | * | 3/2004 | Duggirala et al. | .......... 148/570 |
| 6,736,021 B2 | * | 5/2004 | Adams et al. | .......... 74/388 PS |
| 6,868,749 B2 | * | 3/2005 | Cashatt et al. | ................ 74/492 |
| 6,939,044 B1 | * | 9/2005 | Lyon et al. | .................... 384/45 |
| 7,032,470 B2 | * | 4/2006 | Robertson et al. | ............ 74/422 |

FOREIGN PATENT DOCUMENTS

| | | |
|---|---|---|
| GB | 2032573 A | 5/1980 |
| JP | (UM) 57-174272 | 11/1982 |
| JP | (UM) 1-81373 | 5/1989 |
| JP | 4-232178 | 8/1992 |
| JP | (UM) 5-7572 | 2/1993 |
| JP | 2000-177606 | 6/2000 |

\* cited by examiner

*Primary Examiner*—Paul N. Dickson
*Assistant Examiner*—Toan C. To
(74) *Attorney, Agent, or Firm*—Miles & Stockbridge P.C.

(57) ABSTRACT

A rack shaft has a rolling contact surface on the opposite side of rack teeth across an axis line X, and a pair of slanted surfaces extending in parallel with the axis line across the rolling contact surface. Furthermore, a roller rolling on the rolling contact surface of the rack shaft and an urging member having contact with the pair of slanted surfaces for applying an urging force are provided. The urging member is attached to the housing, forms an annular configuration surrounding the entire circumference of the rack shaft, and has contact portions having contact with the pair of slanted surfaces to apply the urging force.

2 Claims, 4 Drawing Sheets

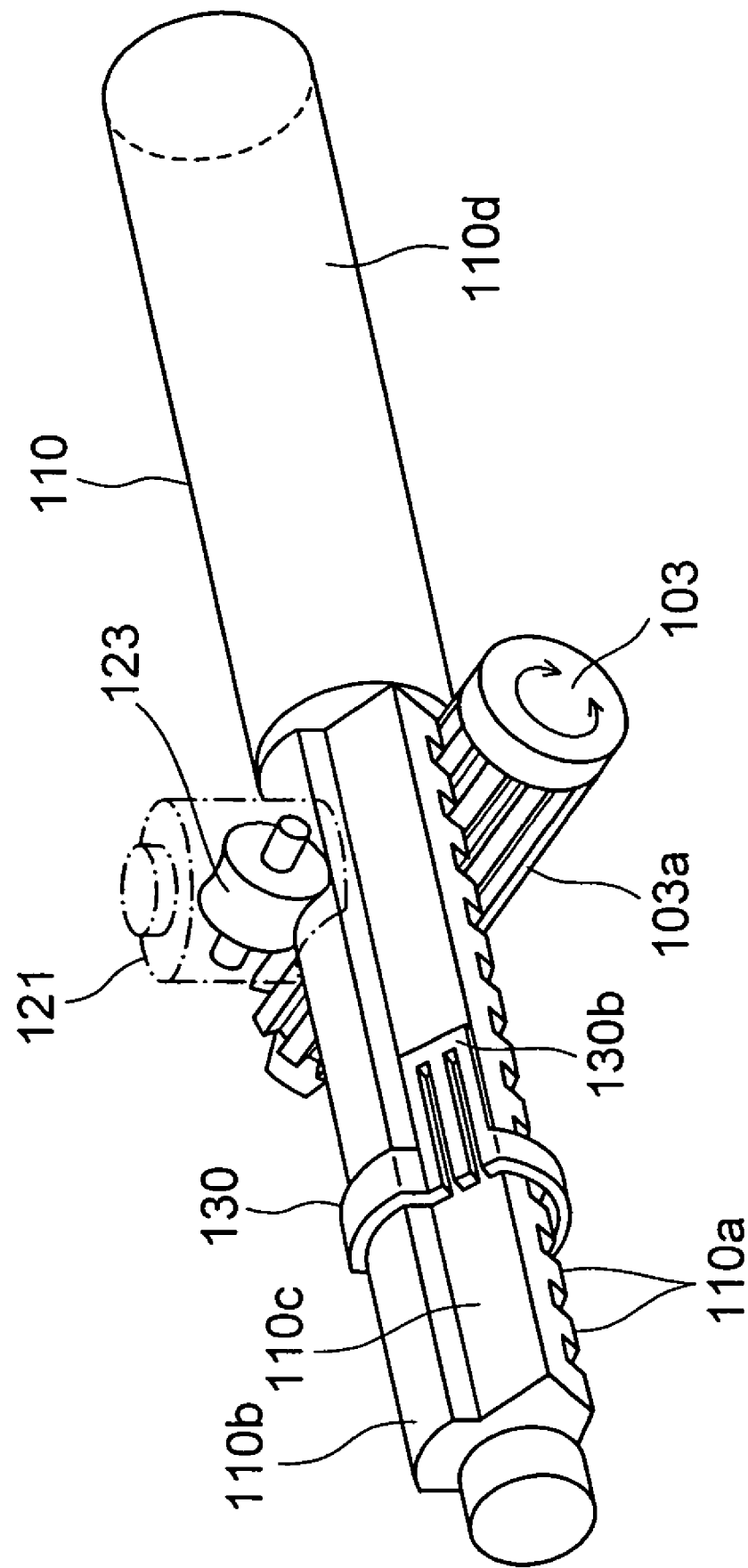

PRIOR ART

STEERING SYSTEM

TECHNICAL FIELD

The present invention relates to a steering apparatus, and more particularly, to a rack-and-pinion steering apparatus which includes a rack shaft and a pinion.

BACKGROUND ART

One known type of steering apparatus of a vehicle is a rack-and-pinion steering apparatus in which a rotational force and an amount of rotation of a pinion are converted into a thrust in the axial direction and a stroke of a rack shaft by meshing engagement of the rack teeth of the rack shaft with the pinion. Here, in some of rack holding mechanisms for holding a rack, the transmission efficiency has been improved, and the steering torque has been reduced by providing a rolling rack guide, etc., which can support the rack by a roller, etc., rotating at a holding part for holding the back surface (the opposite side of the rack teeth) of the rack shaft.

At the same time, a so-called Y-type rack shaft, which is produced by forging to have a Y-type (shaped) section orthogonal to the axis line, has been developed in order to improve the strength of the rack teeth. An example, in which such a Y-type rack shaft and the rolling rack guide described above are applied to a steering apparatus, is shown in FIG. 4. In FIG. 4, an output shaft 3 extending horizontally in a housing 1 is connected to an unillustrated steering shaft, and rotatably supported by bearings 5, 6 with respect to the housing 1. The inner ring of the bearing 6 is fixed to the end of the output shaft 3 by a nut 8, and the outer ring of the bearing 6 is attached to the housing 1 by screwing a fixing member 9, which also serves as a cover member.

The housing 1 is provided with a hollow columnar portion 1c formed from the circumference of the rack shaft 10, which is a Y-type rack shaft, extending upward in the figure. A supporting unit 20 is disposed in the hollow columnar portion 1c. The supporting unit 20 includes a substantially cylindrical holder 21, a pin 22 contained in a groove 21a of the holder 21, a roller 24 rotatably supported by a bearing 23 with respect to the pin 22, a pipe-shaped screw member 25 for attaching the holder 21 to the hollow columnar portion 1c, a disc spring 24A disposed between the holder 21 and the screw member 25 for urging the holder 21 to the rack shaft 10 against the screw member 25, and a lock member 26 of the screw member 25.

The rack shaft 10 has a pair of slanted surfaces 10c, 10c on both sides across a cylindrical surface 10b provided on the opposite side of rack teeth 10a in mesh with a pinion 3a of the output shaft 3. The roller 24 has an integral structure connecting a pair of truncated cones 24a, 24a by a cylindrical portion 24b. The truncated cones 24a, 24a are disposed rotatably along the slanted surfaces 10c, 10c of the rack shaft 10, respectively, thereby having a function of restraining a rotational displacement of the rack shaft 10.

Here, when a strong force is transmitted between the output shaft 3 and the rack shaft 10, such a force is supported by the supporting unit 20. Since the roller 24 has a structure described above, the slanted surfaces 10c, 10c of the rack shaft 10 enters into the truncated cones 24a, 24a and acts so as to push and spread them by a so-called wedge action. Thus, the truncated cones 24a, 24a deform as shown by the dotted line in the figure, thereby disadvantageously hindering the smooth rotation. To cope with this, an increase in the rigidity of the roller 24 can be considered in order to restrain the deformation of the truncated cones 24a, 24a. However, in order to restrain the deformation against the wedge action, it is necessary to construct the roller 24 to be considerably strong. Thus, there is a problem in that the entire steering apparatus becomes large and heavy.

The present invention has been made in view of the problems of these conventional techniques, and it is an object of the present invention to provide a steering apparatus having a light-weight and compact configuration and capable of supporting the Y-type rack shaft more appropriately.

In order to achieve the above object, according to the present invention, there is provided a steering apparatus including:

a housing; a rack shaft connected to a steering mechanism, having rack teeth formed at least on part of an outer surface, and movably supported with respect to the housing; and a pinion connected to a steering wheel and having meshing engagement with the rack teeth, wherein the rack shaft is provided with a rolling contact surface on the opposite side of the rack teeth across an axis line and a pair of surfaces extending in parallel with an axis line on both sides across the rolling contact surface, the apparatus further comprises a rolling member rolling on the rolling contact surface of the rack shaft and an urging member having contact with the pair of surfaces and applying an urging force, wherein the urging member is attached to the housing, forms an annular configuration surrounding the entire circumference of the rack shaft, and has a contact portion having contact with the pair of surfaces to apply an urging force.

By the steering apparatus according to the present invention, in the steering apparatus including: a housing; a rack shaft connected to a steering mechanism, having rack teeth formed at least on part of an outer surface, and movably supported with respect to the housing; and a pinion connected to a steering wheel and having meshing engagement with the rack teeth, the rack shaft is provided with a rolling contact surface on the opposite side of the rack teeth across an axis line and a pair of surfaces extending in parallel with an axis line on both sides across the rolling contact surface. Furthermore, the apparatus includes a rolling member rolling on the rolling contact surface of the rack shaft and an urging member having contact with the pair of surfaces and applying an urging force, wherein the urging member is attached to the housing, forms an annular configuration surrounding the entire circumference of the rack shaft, and has a contact portion having contact with the pair of surfaces to apply an urging force. Therefore, the force exerted on the rack shaft by the pinion can be supported by the rolling member contacting with the rolling contact surface. Moreover, it is possible to restrain a rotational displacement of the rack shaft about the axis line by applying the urging force against the pair of surfaces of the rack shaft by the contacting portion of the urging member. Also, since the urging member has an annular configuration, it is advantageously possible to easily attach/detach the urging member to/from the housing without using a connecting member such as adhesive or a screw.

Furthermore, the contact portion of the urging member preferably includes a pressing portion having the shape of a cantilever.

BRIEF DESCRIPTION OF THE DRAWINGS

FIG. 3 is an extracted perspective view of a rack shaft, a cylindrical roller, and an urging member of the present embodiment.

BEST MODE FOR CARRYING OUT THE INVENTION

In the following, a description will be given of an embodiment of the present invention based on the drawings.

Figure 1:
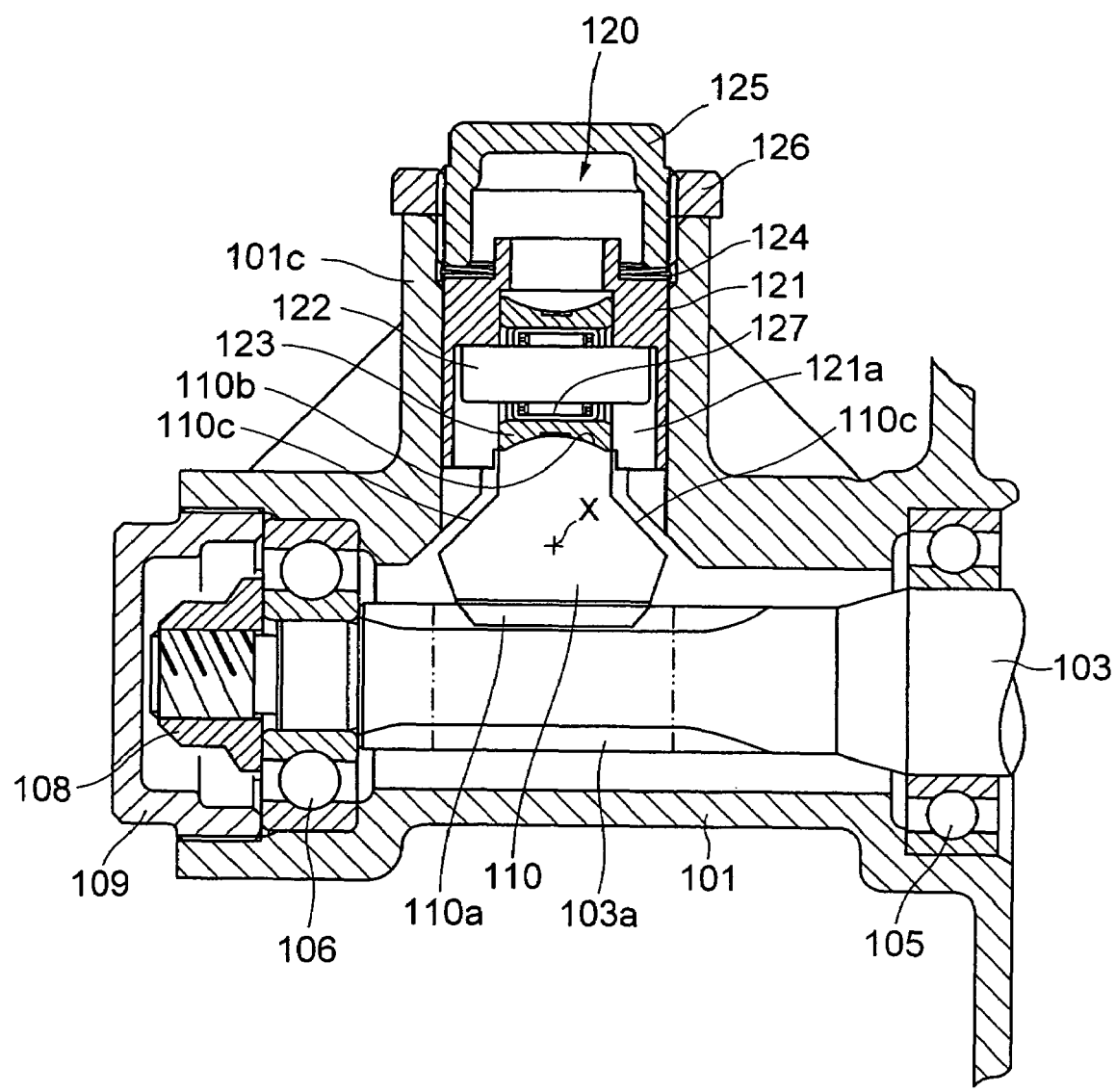
FIG. 1 is a sectional view illustrating part of a rack-and-pinion steering apparatus according to the present embodiment.

FIG. 1 is a sectional view illustrating part of a rack-and-pinion steering apparatus according to the present embodiment. In FIG. 1, an output shaft 103 horizontally extending in the housing 101 is connected to an unillustrated steering shaft, and is rotatably supported by sealed bearings 105, 106 with respect to the housing 101. The inner ring of the bearing 106 is fixed to the output shaft 103 by a nut 108 screwed on the output shaft 103. The outer ring of the bearing 106 is attached to the housing 101 by screwing a fixing member 109, which also serves as a cover member. A pinion 103a of the output shaft 103 has meshing engagement with rack teeth 110a of a rack shaft 110 whose both ends are connected to tie rods of an unillustrated traveling wheel steering mechanism.

The housing 101 is provided with a hollow columnar portion 101c formed from the circumference of the rack shaft 110 extending upward in the figure. A supporting unit 120 is disposed in the hollow columnar portion 101c. The supporting unit 120 includes a cylindrical holder 121, a pin 122 whose both ends are attached to a groove 121a of the holder 121, a cylindrical roller 123, which is a rotating member disposed about the pin 122, a needle bearing 127 rotatably supporting the cylindrical roller 123 with respect to the pin 122, a screw member 125 for attaching the holder 121 to the hollow columnar portion 101c, a disc spring 124 disposed between the screw member 125 and the holder 121 for urging the holder 121 to the rack shaft 110, and a lock member 126 of the screw member 125. By adjusting the amount of screwing of the screw member 125, the amount of compression of the disc spring 124 is changed, thereby making it possible to adjust the pressing force to the rack shaft 110. After the adjustment, the screw member 125 can be locked by the lock member 126 to prevent the screw member 125 from being loosened.

Figure 4:
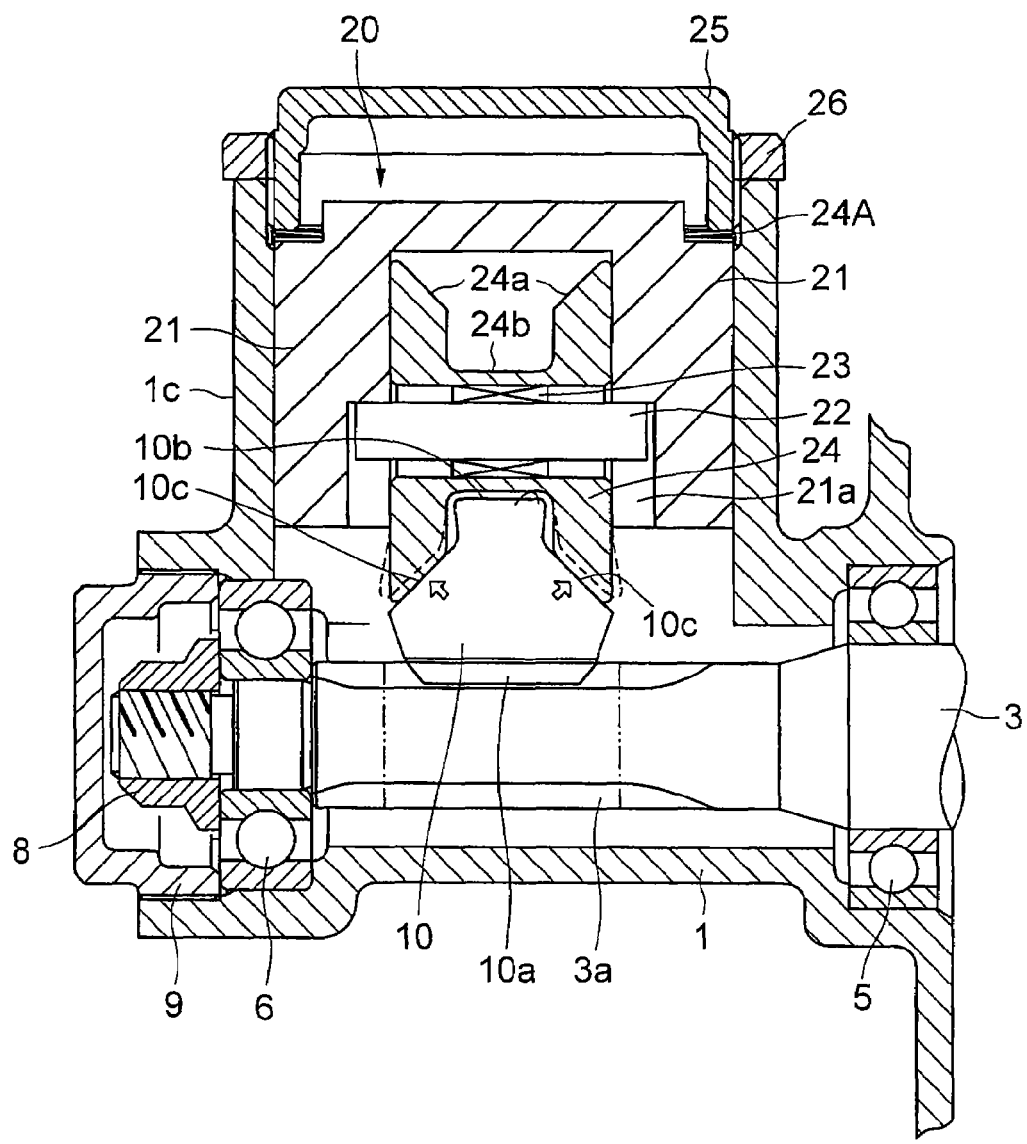
FIG. 4 is a sectional view illustrating part of a rack-and-pinion steering apparatus to be compared with the present embodiment.

On the rack shaft 110, on the opposite side (called back surface side) of the rack teeth 110a across the axis line X, in a cross section orthogonal to an axis line X shown in FIG. 1, a rolling contact surface 110b is formed at the upper center, and slanted surfaces (a pair of surfaces) 110c, 110c slanting in the facing direction each other are formed on both sides at the place lowered one step. Such a rack shaft is called a Y-type rack shaft, and is formed by forging work in the present embodiment. The rolling contact surface 110b is formed as a convex curved surface, and the circumferential surface of the cylindrical roller 123 is formed as a concave curved surface corresponding to the convex curved surface. However, the rolling contact surface 110b may be a flat surface, and the cylindrical roller 123 may be a cylindrical surface. In this regard, unlike the structure shown in FIG. 4, the cylindrical roller 123 itself hardly have a function of restraining a rotational displacement of the rack shaft 110. Such a function is guaranteed by an urging member 130 described below.

Figure 2A:
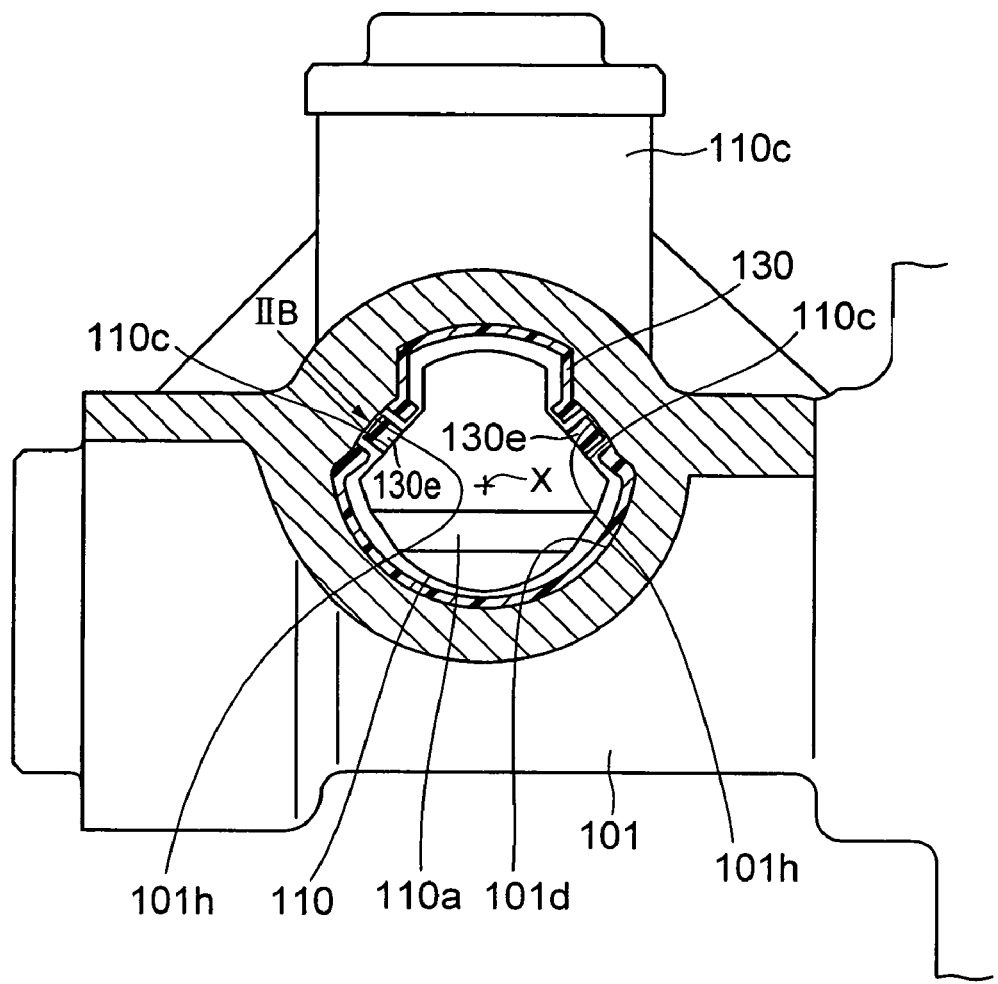
FIG. 2A is a sectional view illustrating part of the rack-and-pinion steering apparatus according to the present embodiment, cut off at a different position from the position in FIG. 1.
Figure 2B:
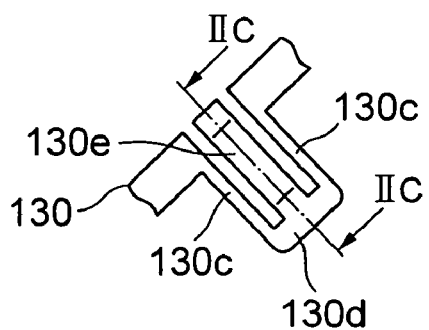
FIG. 2B is a view illustrating the configuration in FIG. 1 as viewed in the arrow direction IIB.
Figure 2C:
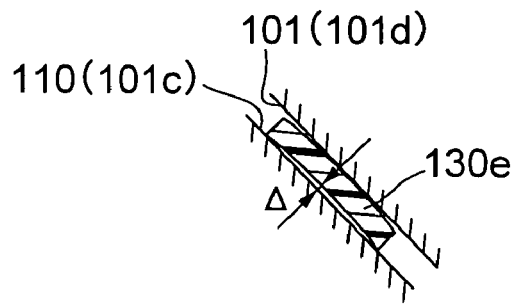
FIG. 2C is a view illustrating the configuration in FIG. 2B, cut off by the line IIC-IIC as viewed in the arrow direction.

FIG. 2A is a sectional view illustrating part of a rack-and-pinion steering apparatus according to the present embodiment, cut off at a different position from the position in FIG. 1. FIG. 2B is a view illustrating the configuration in FIG. 1 as viewed in the arrow direction IIB. FIG. 2C is a view illustrating the configuration in FIG. 2B, cut off by the line IIC-IIC as viewed in the arrow direction. FIG. 3 is an extracted perspective view of a rack shaft, a cylindrical roller, and an urging member of the present embodiment. As shown in FIG. 3, the rack shaft 110 is provided with rack teeth 110a formed as far as the half of the entire length, and the remainder forms a cylindrical surface 110d.

In FIGS. 2A to 2C, an urging member 130 is disposed in a hole 101d extending along the direction of the rack shaft 110 of the housing 101. Since the urging member 130 is annular, the urging member 130 can be easily attached to, or detached from the housing 101 without using a connecting member such as adhesive or a screw. However, the urging member 130 can be attached using adhesive supplementally as a matter of course. For the urging member 130, polyacetal resin having an excellent characteristic in heat resistance and strength is preferable, but the urging member 130 is not limited to this.

As shown in FIG. 3, the urging member 130 is disposed at the portion on which the rack teeth 110a are formed on the rack shaft 110, and forms an annular configuration surrounding the rack shaft 110. Also, the urging member 130 has a pair of the contact portions 130b, 130b contacting the slanted surfaces 110c, 110c of the rack shaft 110.

As shown in FIG. 2B, each contact portion 130b has an E-shaped structure including a pair of extending parts 130c, 130c extending form the annular parts of the urging member 130 along the slanted surface 110c of the rack shaft 110, a connecting part 130d connecting each end of the extending parts 130c, 130c, and a pressing part 130e whose one end is connected to the extending part 130c and the other end extends in a cantilever state.

For the assembly of the urging member 130, in FIG. 2A, machine work is performed on opposing surfaces (here, concave curved surfaces) 101h, 101h of the housing 101 corresponding to the slanted surfaces 110c, 110c of the rack shaft 110 to set the gaps between the pressing parts 130e, 130e and the slanted surfaces 110c, 110c within an appropriate range. Then the urging member 130 is attached to the hole 110d such that the movement of the urging member 130 in the axial direction is constrained using the work step between the work surface and the casting surface.

As shown in FIG. 2C, both ends of each pressing part 130e are brought into contact only with the slanted surfaces 110c of the rack shaft 110, the central part of each pressing part 130e is brought into contact only with the hole 101d of the housing 101. Since each pressing part 130e suppresses a rotational displacement and vibration of the rack shaft 110 about the axis line X with respect to the housing 101 by the elastic force thereof, it is possible to effectively suppress, for example, the occurrence of rattling noise. Assuming that the thickness of the pressing part 130e is 3 to 5 mm, the gap Δ between the central part of the pressing part 130e and the slanted surface 110c should be about 0.05 to 0.5 mm. The gap Δ should desirably be larger than the maximum amount of deformation of the disc sprint 124 of the supporting unit 120. This is because when an excessive force is applied between the pinion 103a and the rack shaft 110 by a travelling wheel colliding with a paved step of sidewalk, for example, that force should be exerted on the supporting unit 120, and should not be exerted on the pressing part 130e in order to prevent the contacting member 130 from being damaged. In this regard, if the corners contacting the rack shaft 110 at the end of each pressing part 130e is rounded off, it becomes possible to restrain the lubricant adhered to the surface from being scraped when the rack shaft 110 relatively moves, and thus the lubricity can be improved.

A description will be given of the operation of the present embodiment. When a steering force is inputted into an unillustrated steering wheel, the steering force is transmitted to the output shaft 103 through an unillustrated steering shaft. As shown in FIG. 3, the rotational force of the output shaft 103 is converted into the longitudinal thrust of the rack shaft 110 through the pinion 103a and the rack teeth 110a having meshing engagement with each other. The rack shaft 110 moves in the vertical direction of the page surface in the figure by the longitudinal thrust, thereby steering unillustrated wheels. At this time, the cylindrical roller 123 rolls on the rolling contact surface 110b, allowing the rack shaft 110 to move with low friction.

As described in the present embodiment, the pressing force exerted on the rack shaft 110 from the pinion 103a is received by the cylindrical roller 123, and a rotational displacement of the rack shaft 110 is suppressed by the urging member 130, which is separated from the cylindrical roller 123. It is therefore possible to restrict the axial direction size of the cylindrical roller 123, and thus the structure in the vicinity of the pinion 103a of the rack shaft 110 can be made compact.

As described above, the present invention has been described in detail with reference to the embodiment. The present invention, however, should not be construed as being limited to the embodiment described above. The present invention can be properly modified and improved as a matter of course without departing from the spirit and scope of the invention.

The invention claimed is:

1. A steering apparatus comprising:
a housing; a rack shaft connected to a traveling wheel steering mechanism, having rack teeth formed at least on part of an outer surface, and movably supported with respect to the housing; and a pinion connected to a steering wheel and having meshing engagement with the rack teeth,
wherein the rack shaft is provided with a rolling contact surface on the opposite side of the rack teeth across an axis line and a pair of surfaces extending in parallel with the axis line on both sides across the rolling contact surface,
the apparatus further comprises a rolling member rolling on the rolling contact surface of the rack shaft and an urging member having contact with the pair of surfaces and applying an urging force,
wherein the urging member is attached to the housing, forms an annular configuration surrounding the entire circumference of the rack shaft, and has a contact portion having contact with the pair of surfaces to apply the urging force.

2. The steering apparatus according to claim 1, wherein the contact portion of the urging member comprises a pressing portion having the shape of a cantilever.

\* \* \* \* \*